US012603078B2

(12) United States Patent
Kons et al.

(10) Patent No.: US 12,603,078 B2
(45) Date of Patent: Apr. 14, 2026

(54) GENERATING SPEECH DATA USING ARTIFICIAL INTELLIGENCE TECHNIQUES

(71) Applicant: International Business Machines Corporation, Armonk, NY (US)

(72) Inventors: Zvi Kons, Haifa (IL); Ron Hoory, Haifa (IL); Vyacheslav Shechtman, Haifa (IL); Avihu Dekel, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 18/449,809

(22) Filed: Aug. 15, 2023

(65) Prior Publication Data

US 2025/0061882 A1 Feb. 20, 2025

(51) Int. Cl.
*G10L 13/02* (2013.01)
*G10L 13/10* (2013.01)

(52) U.S. Cl.
CPC .............. *G10L 13/02* (2013.01); *G10L 13/10* (2013.01)

(58) Field of Classification Search
CPC ................................ G10L 13/02; G10L 13/10
See application file for complete search history.

(56) References Cited

U.S. PATENT DOCUMENTS

2013/0085760 A1 4/2013 Stephens, Jr.
2021/0350786 A1 11/2021 Chen et al.
2022/0051654 A1 2/2022 Finkelstein et al.
2022/0328041 A1 10/2022 Shechtman
2024/0371356 A1* 11/2024 Li .......................... G06N 3/045

FOREIGN PATENT DOCUMENTS

WO 2025/037162 A1 2/2025

OTHER PUBLICATIONS

Du et al., Efficient Incremental Text-to-Speech on GPUs, arXiv:2211.13939, 2022 (Year: 2022).*
Kim et al., An Investigation of Functional Relations between Speech Rate and Phonetic Variables, Journal of Phonetics, 2022 (Year: 2022).*
Shechtman et al., Synthesis of Expressive Speaking Styles with Limited Training Data in a Multi-Speaker, Prosody-Controllable Sequence-to-Sequence Architecture, Interspeech, 2021 (Year: 2021).*
(Continued)

*Primary Examiner* — Bhavesh M Mehta
*Assistant Examiner* — Eunice Lee
(74) *Attorney, Agent, or Firm* — Ryan, Mason & Lewis, LLP

(57) ABSTRACT

Methods, systems, and computer program products for generating speech data using artificial intelligence techniques are provided herein. A computer-implemented method includes implementing one or more artificial intelligence techniques in connection with one or more speech synthesis tasks; generating, in multiple sequential portions, at least one sequence of data, comprising one or more of phonetic data and prosodic data, by processing at least one previously generated sequence of data using the one or more artificial intelligence techniques; and generating speech data corresponding to at least a portion of the sequence of data by processing the at least a portion of the sequence of data using at least one artificial intelligence-based speech synthesis model.

20 Claims, 9 Drawing Sheets

(56) References Cited

OTHER PUBLICATIONS

Wu et al., SpeechGen: Unlocking the Generative Power of Speech Language Models with Prompts, arXiv:2306.02207, 2023 (Year: 2023).*
Li et al., Styletts 2: Towards human-level text-to-speech through style diffusion and adversarial training with large speech language models, Advances in Neural Information Processing Systems, 2023 (Year: 2023).*
Xue et al., FoundationTTS: Text-to-Speech for ASR Customization with Generative Language Model, arXiv:2303.02939, 2023 (Year: 2023).*
Saeki et al., Incremental Text-to-Speech Synthesis Using Pseudo Lookahead with Large Pretrained Language Model, IEEE Signal Processing Letters, 2021 (Year: 2021).*
Ren et al., ProsoSpeech: Enhancing Prosody With Quantized Vector Pre-training in Text-to-Speech, arXiv:2202.07816, 2022 (Year: 2022).*
Sofroniev et al., Phonetic Vector Representations for Sound Sequence Alignment, Proceedings of the Fifteenth Workshop on Computational Research in Phonetics, Phonology, and Morphology, 2018 (Year: 2018).*
Guo, et al., PROMPTTTS: Controllable Text-to-Speech with Text Descriptions, arXiv:2211.12171, 2022 (Year: 2022).*
Stephenson et al., Alternate Endings: Improving Prosody for Incremental Neural TTS with Predicted Future Text Input, arXiv:2102.09914, 2021 (Year: 2021).*
Zhang, et al. SpeechGPT: Empowering Large Language Models with Intrinsic Cross-modal Conversational Abilities, arxiv.org/abs/2305.11000, 2023 (Year: 2023).*
Guo et al., High-Quality Prosody Generation in Mandarin Text-to-Speech System, Fujitsu Scientific & Technical Journal, Jan. 2010.
Zen, H., Generative Model-Based Text-to-Speech Synthesis, Google, Feb. 3, 2017.
Kharitonov et al., Text-Free Prosody-Aware Generative Spoken Language Modeling, Facebook AI Research, May 10, 2022.
Saeki et al., Low-Latency Incremental Text-to-Speech Synthesis with Distilled Context Prediction Network, arXiv: 2109.10724v1 [cs.SD] Sep. 22, 2021.
Muyang Du et al. Efficient Incremental Text-to-Speech on GPUs, arxiv.org, Cornell University Library, 201 Olin Library Cornell University Ithaca, Ny 14853, Dec. 5, 2022 (Dec. 5, 2022), XP091385853.
Saeki Takaaki et al. Incremental Text-to-Speech Synthesis Using Pseudo Lookahead with Large Pretrained Language Model, IEEE Signal Processing Letters, IEEE, USA vol. 28, Apr. 16, 2021 (Apr. 16, 2021), pp. 857-861, XP011853947, DOI: 10.1109/ASRU51503.2021.9687904.
Saeki Takkaki et al. Low-Latency Incremental Text-to-Speech Synthesis with Distilled Context Prediction Network, 2021 IEEE Automatic Speech Recognition and Understanding Workshop (ASRU), IEEE, Dec. 13, 2021 (Dec. 13, 2021), pp. 749-756, XP034076947, DOI: 10.1109/ASRU51503.2021.9687904.
Brooke Stephenson et al. Alternate Endings: Improving Prosody for Incremental Neural TTS with Predicted Future Text Input, arxiv.org, Cornell University Library, 201 Olin Library Cornell University Ithaca, NY 14853, Jun. 15, 2021 (Jun. 15, 2021), XP081979275.
Guo Zhifang et al. Promptts: Controllable Text-to-Speech with Text Descriptions, ICASSP 2023—2023 IEEE International Conference on Acoustics, Speech and Signal Processing (ICASSP), IEEE, Jun. 4, 2023 (Jun. 4, 2023), pp. 1-5, XP034450209, DOI: 10.1109/ICASSP49357.2023.10096285.
Dong Zhang et al. SpeechGPT: Empowering Large Language Models with Intrinsic Cross-Modal Conversational Abilities, arxix.org, Cornell University Library, 201 Olin Library Cornell University Ithaca, NY 14853, May 18, 2023 (May 18, 2023), XP091511923.
Avihu Dekel et al. Speak While You Think: Streaming Speech Synthesis During Text Generation, arxiv.org, Cornell University Library, 201 Olin Library Cornell University Ithaca, NY 14853, Sep. 20, 2023 (Sep. 20, 2023), XP091618564.
International Search Report, Aug. 13, 2024.

* cited by examiner

700

| Decoding step | 1 | 2 | 3 | 4 | 5 | 6 |
|---|---|---|---|---|---|---|
| GLM output | I | see | what | the | problem | Is! |
| Adaptor output | AY0 | S IY1 | W AH0 T | DH IX0 | P R AA1 B L AX0 M | IH1 Z |
| Word Rhythm | 0.76 | 0.38 | -0.65 | -0.93 | -0.35 | 0.90 |
| Word Pitch Level | 0.19 | 0.63 | 0.318 | -0.05 | -0.15 | -0.68 |
| Word Pitch Dynamics | -0.59 | -0.07 | -0.09 | -0.41 | -0.23 | -0.28 |
| Word Pitch Slope | 0.18 | 0.67 | -0.95 | -0.59 | 0.11 | 0.05 |
| Sentence Rhythm | 0.23 | | | | | |
| Sentence Pitch Level | 0.1 | | | | | |
| Sentence Pitch Dynamics | 0.34 | | | | | |
| Sentence Pitch Slope | -0.30 | | | | | |

*FIG. 7*

GENERATING SPEECH DATA USING ARTIFICIAL INTELLIGENCE TECHNIQUES

BACKGROUND

The present application generally relates to information technology and, more particularly, to language and speech processing. More specifically, instances arise wherein it is desired to predict a text output of a word or token given previous text, and if such output is to be used in a conversation-related context, then the text needs to be converted to speech data. However, conventional speech synthesis techniques include limitations such as, for example, significant latency issues, accuracy issues, and inability to sufficiently capture style and emotion in speech data.

SUMMARY

In at least one embodiment, techniques for generating speech data using artificial intelligence techniques are provided.

An example computer-implemented method includes implementing one or more artificial intelligence techniques in connection with one or more speech synthesis tasks, and generating, in multiple sequential portions, at least one sequence of data, comprising one or more of phonetic data and prosodic data, by processing at least one previously generated sequence of data using the one or more artificial intelligence techniques. Additionally, the method also includes generating speech data corresponding to at least a portion of the sequence of data by processing the at least a portion of the sequence of data using at least one artificial intelligence-based speech synthesis model.

At least one embodiment can include combining at least one language model (LM), at least one text-to-speech frontend (TTS-FE) model and at least one text-to-speech prosody (TTS-P) model. Additionally or alternatively, one or more embodiments can include converting, using a language model-text-to-speech algorithm adaptor, at least a portion of output from at least one LM to phonetic data and prosodic data to be used as input for one or more of at least one TTS-FE model and at least one TTS-P model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, where the software modules are stored in a tangible computer-readable storage medium (or multiple such media).

Illustrative embodiments can provide significant advantages relative to conventional speech synthesis techniques. For example, problems associated with latency issues, accuracy issues, and inability to sufficiently capture style and emotion in speech data are overcome in one or more embodiments, such as those noted above, through generating speech data using artificial intelligence techniques in connection with phonetic data and/or prosodic data.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 is a diagram illustrating an example LM-TTS adaptor output, according to an example embodiment of the invention;

DETAILED DESCRIPTION

Figure 1:
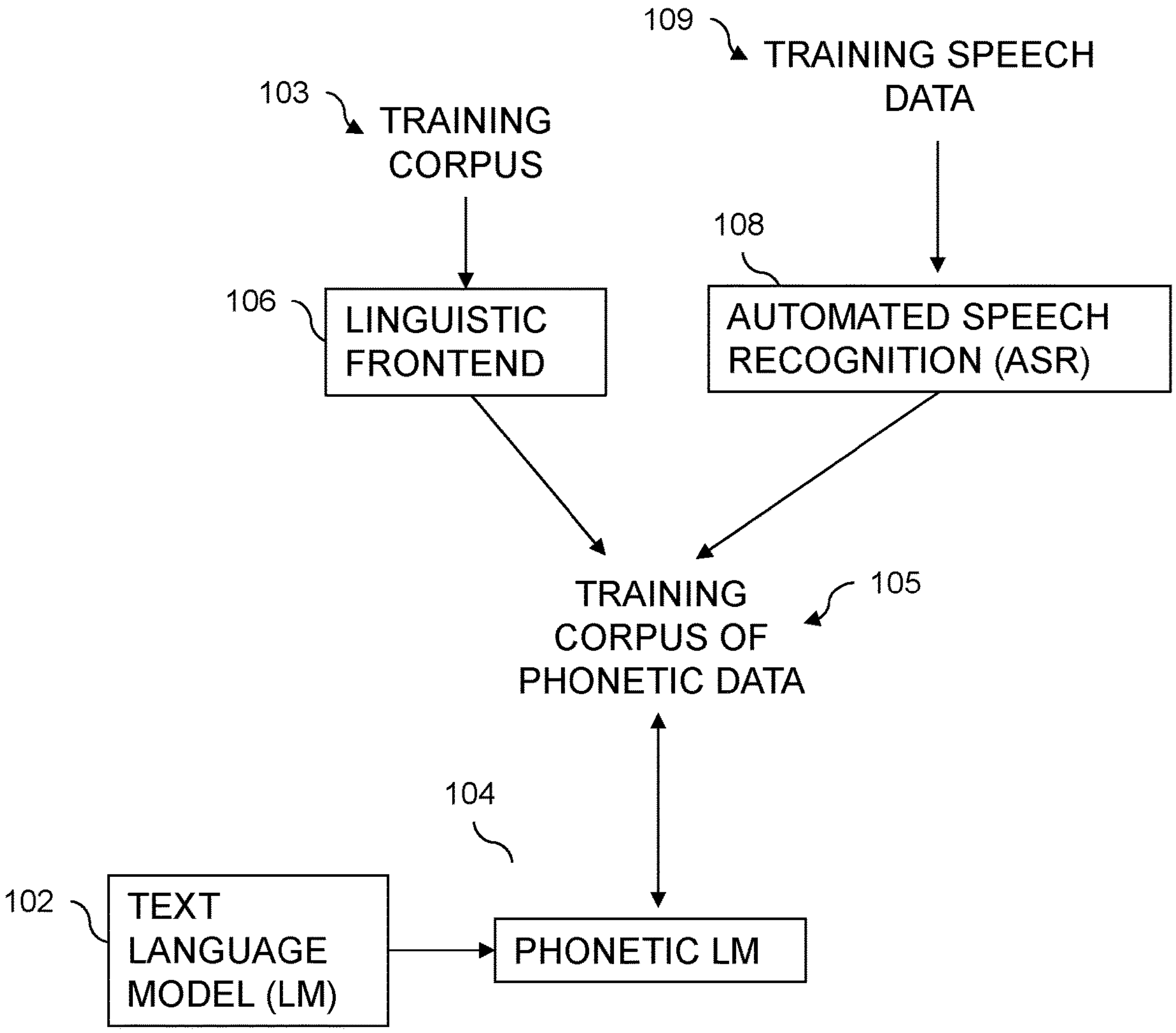
FIG. 1 is a diagram illustrating training a LM using phonetic transcripts, according to an example embodiment of the invention.

As described herein, at least one embodiment includes generating speech data using artificial intelligence techniques. In one or more embodiments, one or more LMs are trained to output the next text token(s) in a sequence given some textual input. Additionally or alternatively, one or more LMs can be trained to output the next text token(s) based on one or more previously generated tokens and, optionally, a query. When used, for example, in connection with a voice conversation context and/or implementation, such output text is converted into speech data using, e.g., at least one speech synthesis system.

Also, as used herein, a generative language model (G-LM) refers to an autoregressive language model or autoregressive text-prediction model that sequentially generates words (e.g., a fixed number of words at a time), provided a sequence of the previously synthesized words (optionally preceded with a textual query), and can also output a sequence of related inner states. Additionally, as used herein, a generative text-to-speech frontend (G-TTS-FE) model refers to a neural model that sequentially generates a TTS-FE symbolic sequence (e.g., symbols (for instance, a fixed number of symbols at a time) suitable for a speech synthesis procedure) from plain and/or annotated text (e.g., a word sequence), wherein the symbolic sequence, suitable for speech synthesis comprises at least one phonetic sequence (e.g., phonemes, lexicographic stress, etc.), optionally phrase type information, and optionally one or more annotations such as part of speech, word emphasis, etc.

Further, as used herein, a generative text-to-speech prosody (G-TTS-P) model refers to a neural model that sequentially generates, from plain and/or annotated text, a TTS-P sequence including prosodic feature vectors (e.g., a fixed number of prosodic feature vectors at a time) that guide at least one subsequent speech synthesis system. Such prosodic feature vectors can comprise, for example, global and/or local assessments of phone rate, pitch, and volume. Additionally, such prosodic feature vectors can be for example, derived from one or more statistical measurements, taken over one or more hierarchical temporal intervals, and/or normalized to become one or more speaker-agnostic features. As also used herein, a generative speech synthesis (G-SS) model refers to a neural model that sequentially generates, from at least one TTS-FE symbolic sequence and at least one sequence of TTS-P feature vectors, at least one output speech waveform.

Accordingly, at least one embodiment can include generating and/or implementing a combined G-LM, G-TTS-FE and G-TTS-P model that sequentially generates the TTS-FE and TTS-P outputs, and optionally one or more related textual outputs, wherein the combined model is succeeded by a G-SS model. Additionally or alternatively, one or more embodiments can include generating and/or implementing a combined G-TTS-FE and G-TTS-P model that sequentially generates the TTS-FE and TTS-P outputs, and which is preceded by a G-LM model and uses its inner state sequence, in addition to a text sequence, as input, and which is succeeded by a G-SS model. Further, at least one embodiment can include generating and/or implementing a combined G-LM, G-TTS-FE, G-TTS-P, and G-SS model that executes an entire end-to-end speech synthesis task.

Also, as further detailed herein, at least one embodiment includes generating speech data using one or more TTS systems in conjunction with output of at least one LM (e.g., at least one G-LM). Such an embodiment includes training the at least one LM to produce one or more types of output, wherein such output can include phonetic transcription data, one or more phrase types and part-of-speech tagging, word and/or syllables stress information, pause information and/or phrase break information, prosodic information (e.g., prosodic markups which can be useful for real time speech synthesis), etc. In one or more embodiments, such output can be used as direct input for a TTS synthesis model, enabling the TTS synthesis model to start synthesis with minimal latency and to produce more speech-natural output that correctly relays the meaning of the input.

As further detailed herein, at least one embodiment includes modifying an LM, for example, by training the LM to output phonemes and linguistic information in parallel to output words. In such an embodiment, such LM training can include using the original LM training text and extracting one or more phonemes and linguistic information (e.g., phrase type information) therefrom using, for example, at least one TTS linguistic frontend, grapheme-to-phonemes or other similar linguistic analysis tools.

Additionally, one or more embodiments include modifying an LM, for example, by training the LM to produce prosodic information such as, e.g., pitch, phoneme duration, phrase break information, etc. In such an embodiment, such LM training can include feeding the original LM training text to a TTS system and/or a TTS-prosody prediction system (e.g., a G-TTS-P model and/or a G-TTS-FE model as a standalone or an inner TTS component) and extracting prosodic information therefrom (e.g., pitch and energy curves, and phonemes durations). One or more TTS systems can include a G-TTS-P model as an inner component of the TTS system, for example, while other TTS systems (e.g., end-to-end TTS systems) do not include such a model. In such an instance, the speech data can be synthesized and the desired prosody features can be extracted from the waveform(s).

Further, at least one embodiment includes modifying at least one TTS system to use information generated, in accordance with at least a portion of the techniques detailed herein, by at least one LM (e.g., a G-LM) as input instead of merely text input.

As noted above, one or more embodiments include training an LM to produce extended phonetic transcription information and/or mixed output wherein, for example, a query is given as plain text but the response is generated at least in part in phonetic output. To train the LM accordingly, at least one embodiment can include using at least one existing LM training text corpus and convert at least a portion of such text to extended phonetic script information using at least one TTS system linguistic frontend. Such resulting script information can then be used to train the LM.

One or more embodiments can also include incorporating additional information to such script information by processing at least a portion of the script information using a TTS model. Such additional information can produce, in connection with training at least one LM, enhanced intonation, phoneme durations, pitch information, pause information, etc., which can be helpful for an associated TTS system. By way merely of example, such additional information can include prosodic information that can convey speaker-agnostic speech synthesis features such as, e.g., hierarchical prosody control (HPC) features. Other types of information can include, e.g., word emphasis, emotions (e.g., happy, apologetic, etc.) and speaking style (e.g., conversation, announcement, reading, etc.). Also, in connection with incorporating additional information to script information, such actions do not require the use and/or obtainment of additional data because the additional information can be generated from an original training text corpus.

In one or more embodiments, a TTS system, using such extended phonetic script information and additional and/or prosodic information, can use the output of an LM as a direct input, which can reduce latency because the TTS system will not need a long look ahead to understand the linguistic context and render speech with natural prosody.

Also, at least one embodiment can include fine-tuning and/or enhancing an LM using speech data. Such an embodiment includes extracting phonemes and intonation information from speech data and using at least a portion of such extracted information to train the LM. Such speech data can include, for example, a large speech corpus from many speakers, which can facilitate general intonation improvement, and/or speech data from a single speaker for adaptation to a specific voice or style (e.g., a conversational voice style). Additionally or alternatively, for multi-speaker data, one or more speaker-agnostic features (such as, for example, HPC features) can be utilized and/or required.

As detailed herein, at least one embodiment may provide beneficial effects such as, for example, reducing latency and increasing accuracy in LM and TTS system implementations. In another embodiment, a pre-trained LM is utilized and is not modified. In such an embodiment, an LM-TTS adaptor is created and/or implemented, wherein the LM-TTS adaptor takes the pre-trained LM output and/or its internal state parameters as input, and outputs the phonetic and prosodic information required by at least one corresponding TTS. In one example embodiment, the LM-TTS adaptor uses an encoder-decoder architecture. In such an embodiment, the encoder generates an encoding vector per input word and can have adjustable word look-ahead. The decoder takes the encoder output(s), as well as one or more previous outputs, and produces the phonetic and prosodic information for the current word. Alternatively, one or more embodiments can include implementing separate phonetic and prosodic decoders.

FIG. 1 is a diagram illustrating training an LM using phonetic transcripts, according to an example embodiment of the invention. By way of illustration, FIG. 1 depicts converting a text LM 102 to a phonetic LM 104 using a training corpus 105 of phonetic data, wherein such a trained phonetic LM can generate phonetic transcription data instead of and/or in addition to text data (e.g., generating phonemes, stress information, phrase type information, part-of-speech information, break information, etc.). In one or more embodiments, text LM 102 can include a pre-trained text LM and generating the training corpus 105 of phonetic data can include converting at least a portion of a training corpus 103 of text data to phonetic data using the linguistic frontend 106 (e.g., one or more text processing programs) from a TTS system.

In at least one embodiment, as depicted as optional in FIG. 1, training speech data (e.g., spoken text) 109, derived using automated speech recognition (ASR) techniques 108, can also be incorporated into the training corpus 105, along with text data provided by the linguistic frontend 106. Accordingly, as trained, phonetic LM 104 can process an input (e.g., a question) of text data, and generate a response (e.g., an answer to the question) in phonemes. One or more embodiments can also include incorporating one or more external tags such as, for example, emotions or word emphasis.

Figure 2:
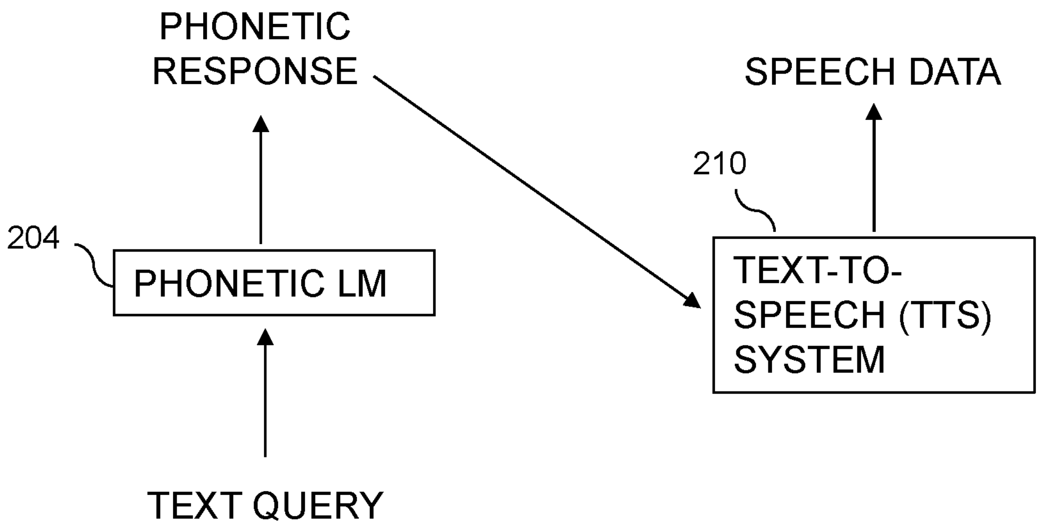
FIG. 2 is a diagram illustrating generating speech data using a text-to-speech (TTS) system and an LM trained with phonetic information, according to an example embodiment of the invention.

FIG. 2 is a diagram illustrating generating speech data using a TTS system and an LM trained with phonetic information, according to an example embodiment of the invention. By way of illustration, FIG. 2 depicts phonetic LM 204 (e.g., a trained phonetic LM such as depicted in FIG. 1), processing a text input (e.g., a query) and generating a phonetic output (e.g., a response to the question). The phonetic output (e.g., a phonetic script) is then provided as input to TTS system 210 (e.g., a reduced TTS system with no linguistic frontend and/or a speech synthesis system trained to be controlled by the selected set of prosodic features predicted by a LM such as phonetic LM 304 depicted in FIG. 3), which processes the input and generates corresponding speech data. In accordance with one or more embodiments, phonetic LM 204 has a significantly large context for producing required annotations of the phonetic output, and phonetic LM 204 can be trained to correctly process homographs and/or text normalization tasks.

Figure 3:
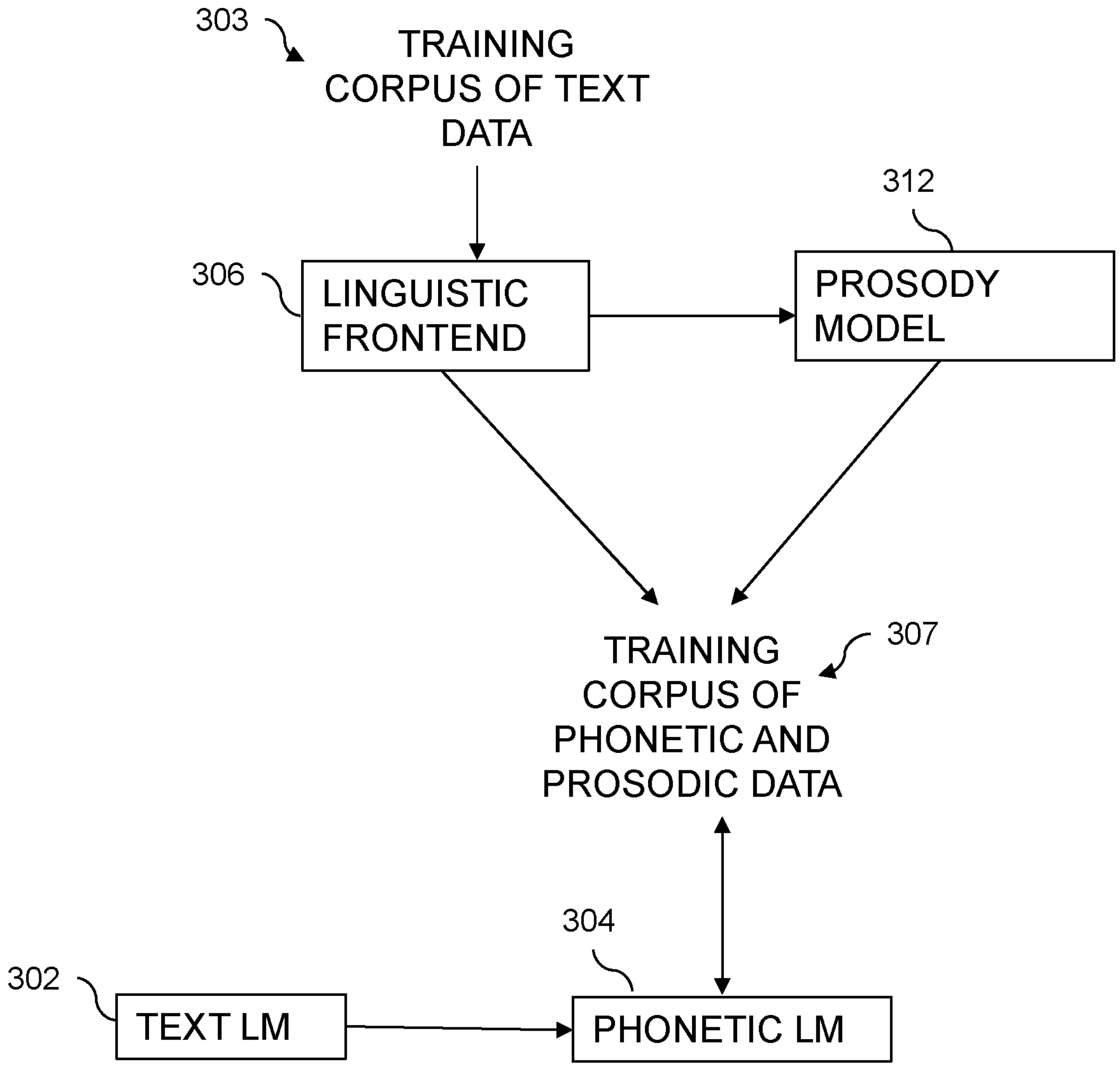
FIG. 3 is a diagram illustrating training an LM using phonetic transcripts and prosodic features, according to an example embodiment of the invention.

FIG. 3 is a diagram illustrating training an LM using phonetic transcripts and prosodic features, according to an example embodiment of the invention. By way of illustration, FIG. 3 depicts modifying text LM 302 to phonetic LM 304 using a training corpus 307 of phonetic data and prosodic data, wherein such a trained phonetic LM 304 can generate enhanced phonetic transcription data with associated prosodic information, instead of and/or in addition to text data. Generating training corpus 307 can include converting at least a portion of a training corpus 303 of text data to phonetic data using a TTS linguistic frontend 306. As also depicted in FIG. 3, one or more embodiments include enhancing training corpus 307 by adding information about prosody and/or intonation, derived from prosody model 312. Prosodic information incorporated into training corpus 307 can include, for example, one or more prosody hints tags (e.g., hints for longer syllables, shorter syllables, higher pitch, lower pitch, etc.), one or more hierarchical tags for speech part (e.g., sentence, word and phoneme modifiers), full pitch curve and phoneme duration, etc. In addition to using prosody model 312, such prosodic information can be generated, for example, by applying a TTS system to training corpus 303 of text data (e.g., offline), and/or by real speech data (e.g., using prosody model 312).

Figure 4:
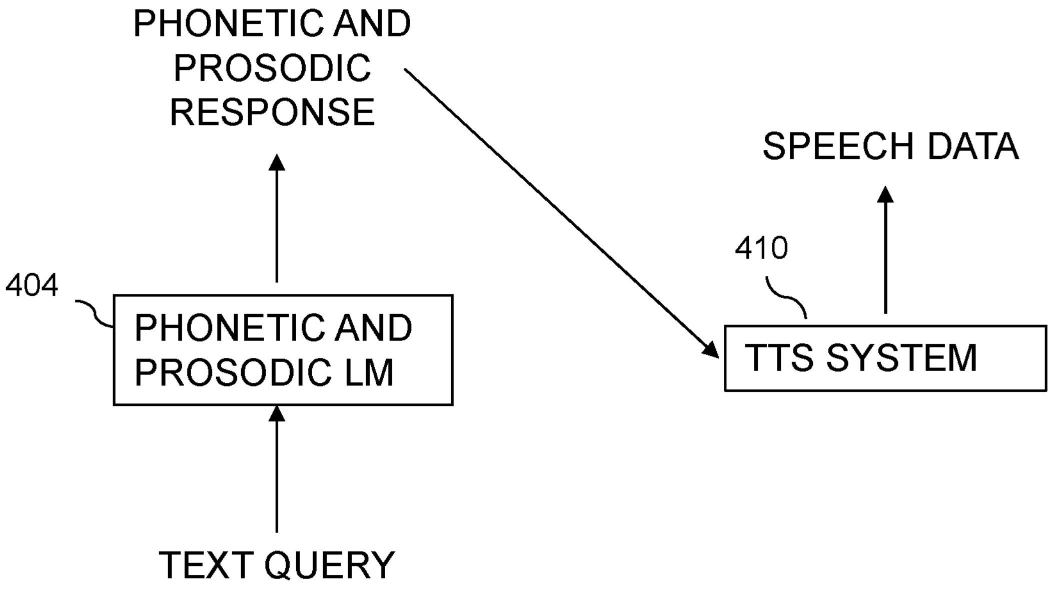
FIG. 4 is a diagram illustrating generating speech data using a TTS system and an LM trained with phonetic information and prosodic features, according to an example embodiment of the invention.

FIG. 4 is a diagram illustrating generating speech data using a TTS system and an LM trained with phonetic information and prosodic features, according to an example embodiment of the invention. By way of illustration, FIG. 4 depicts phonetic and prosodic LM 404 (e.g., a trained phonetic and prosodic LM such as depicted in FIG. 3), processing a text input (e.g., a query) and generating a phonetic and prosodic output (e.g., a response to the query). The output is then provided as input to TTS system 410 (e.g., a low-latency TTS system), which processes the input and generates corresponding speech data. In at least one embodiment, TTS system 410 is modified to use and/or process a phonetic script and associated prosodic information (as generated by phonetic and prosodic LM 404) as input, which can, for example, reduce the TTS system 410 look-ahead (e.g., reduce the look-ahead from several words to several phonemes) and provide a system that can generate speech data approximately as quickly as the LM can generate output data to be fed to the TTS system.

Figure 5:
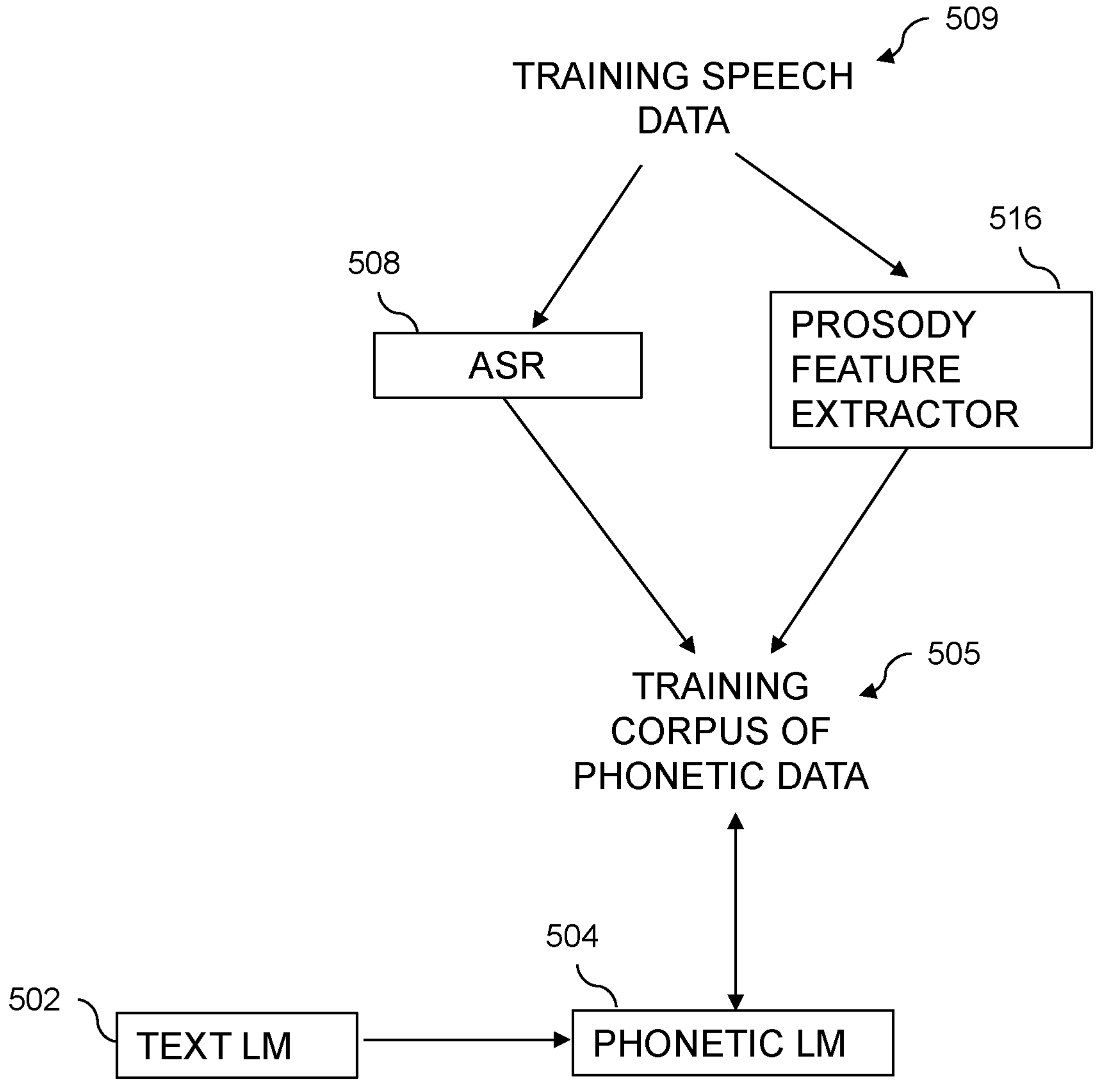
FIG. 5 is a diagram illustrating fine-tuning an LM using speech data, according to an example embodiment of the invention.

FIG. 5 is a diagram illustrating fine-tuning an LM using speech data, according to an example embodiment of the invention. By way of illustration, FIG. 5 depicts modifying text LM 502 to phonetic LM 504 using a training corpus 505 of phonetic data, wherein such a trained phonetic LM 504 can generate enhanced phonetic transcription data instead of and/or in addition to text data. As also depicted in FIG. 5, one or more embodiments include enhancing training corpus 505, and subsequently fine-tuning phonetic LM 504, using training speech data 509 (e.g., real speech data) processed using ASR 508 and prosody feature extractor 516. The ASR 508 is used for extracting information such as phonemes and phoneme durations, and the prosody feature extractor 516 can extract information such as pitch curve and energy. The fine-tuning of phonetic LM 504 using speech data can improve the quality and naturalness of phonetic LM 504 outputs, and can facilitate adaptation of phonetic LM 504 for aspects such as, for example, particular speakers, particular speaking styles (e.g., conversational voice style), emotions, pronunciations, etc.

Additionally or alternatively, at least one embodiment includes connecting and/or using at least one LM and at least one TTS system in conjunction with at least one LM-TTS adaptor which takes the LM output(s) and its internal state and converts such output(s) to one or more phonemes and one or more prosody controls that can be used as input for the TTS system. In such an embodiment, the LM-TTS adaptor model can take advantage of a language model's hidden states to improve accuracy and support conversion in parallel to LM textual generation.

Figure 6:
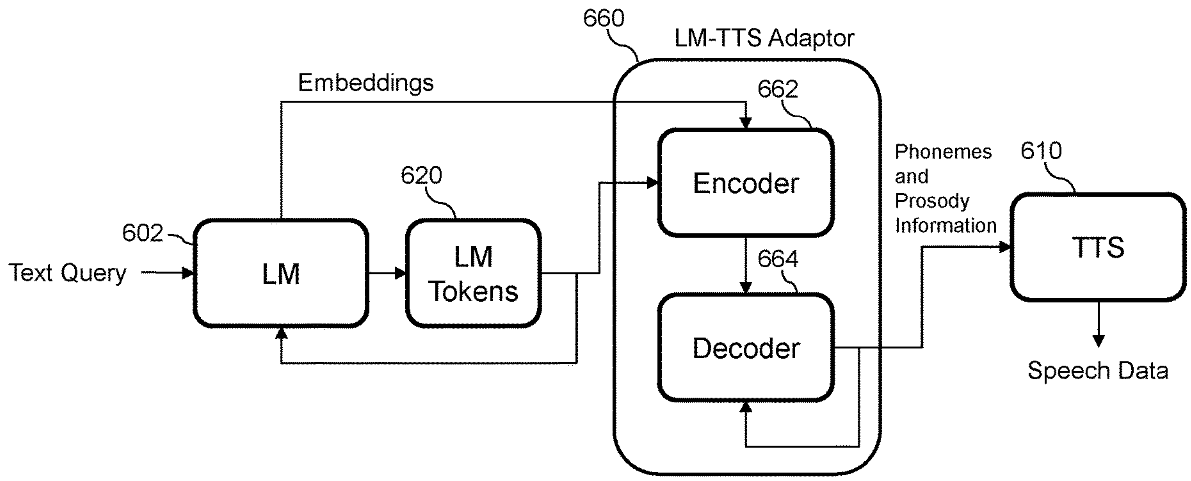
FIG. 6 is a diagram illustrating language model-TTS (LM-TTS) adaptor architecture, according to an example embodiment of the invention.

FIG. 6 is a diagram illustrating LM-TTS adaptor architecture, according to an example embodiment of the invention. By way of illustration, FIG. 6 depicts an example LM-TTS adaptor model which represents an augmented version of a transformer encoder-decoder architecture. Specifically, FIG. 6 depicts LM 602 processing a text query to produce one or more internal state vectors, word embeddings vectors and language model tokens 620 (e.g., one or more textual word pieces). Also, FIG. 6 depicts LM-TTS adaptor 660, which includes encoder 662 and decoder 664.

The encoder 662 processes inputs including at least a portion of the language model tokens 620, combined with the internal state and contextual embeddings vectors from the LM 602. The encoder 662 outputs an embedding vector for each word. In one or more embodiments, the at least a portion of the language model tokens 620 and the semantic information associated with the embeddings can be taken from one or more internal layers of the LM 602 (e.g., one or more deep layers and/or one or more shallow layers) and fed into the encoder 662. By way merely of example, in at least one embodiment, the encoder 662 contains two transformer layers, with a 512—embedding dimension, and eight attention heads.

Additionally, in one or more embodiments, encoder 662 does not attend to future words, a restriction which ensures that the prediction of a word's phonemes is invariant to future words. In such an embodiment, this restriction can also be relaxed, and a fixed look-ahead can be added and/or incorporated, facilitating a trade-off between latency and increased context.

As also depicted in FIG. 6, decoder 664 processes at least a portion of the output(s) generated by encoder 662 and produces and/or outputs one or more phonemes and prosody information (e.g., one or more prosodic features). Also, in one or more embodiments, each phoneme output by the decoder 664 is selected from at least one phonetic vocabulary, while the prosody information can include one or more normalized prosodic observations. Each prosodic observation can include, for example, a normalized linear combination of statistical measures evaluating a certain prosodic metric (e.g., pitch [Hz], rhythm [phone durations], loudness [dB], etc.) over a predetermined period of time. In such an embodiment, implementing decoder 664 can include deploying a set of hierarchical aggregations (e.g., sentence-level aggregations, word-level aggregations, etc.).

In at least one embodiment, decoder 664 outputs one or more phonemes and prosody information via autoregressive prediction. In such an embodiment, the decoder 664 takes as input the encoder outputs (e.g., word embedding vectors) as well as the previously generated phoneme and prosody outputs, and predicts the next phoneme and prosody output, an example of which is depicted in FIG. 7.

FIG. 7 is a diagram illustrating an example modified LM or LM-TTS adaptor output 700, according to an example embodiment of the invention. By way of illustration, FIG. 7 depicts example modified LM or LM-TTS adaptor output 700 in the form of a table which includes information pertaining to decoding step, LM text output, phonetic output, and word level and sentence level HPC parameters.

Referring again to FIG. 6, in one or more example embodiments, decoder 664 can include four transformer layers, with a 512—embedding dimension, and eight attention heads. While the LM 602 is generating text, the LM-TTS adaptor 660 runs in parallel. By way merely of example, in at least one embodiment, every time the LM 602 finishes generating one word, the encoder 662 runs on the LM outputs, followed by multiple passes through the decoder 664, which auto-regressively generates a relevant sequence of phoneme and prosody outputs until an end-of-word token is predicted by the decoder 664. After the decoder 664 stops, its outputs are sent to the TTS system 610 to be synthesized as speech data.

Figure 8:
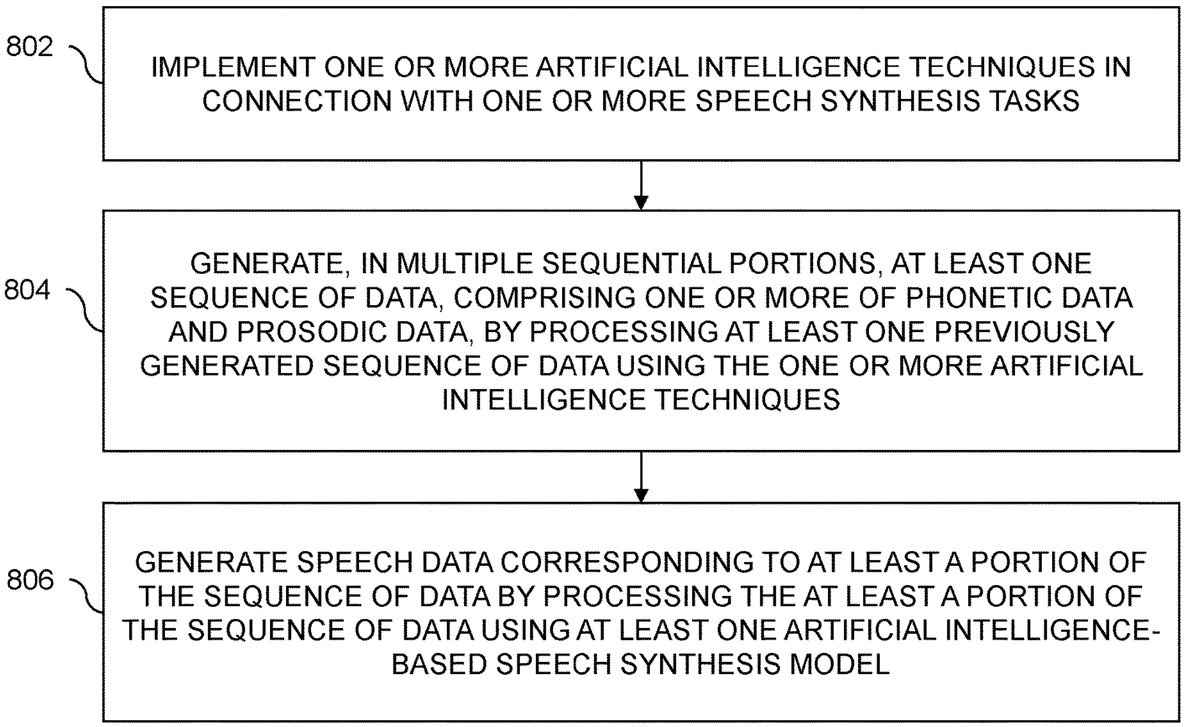
FIG. 8 is a flow diagram illustrating techniques according to an example embodiment of the invention.

FIG. 8 is a flow diagram illustrating techniques according to an embodiment of the present invention. Step 802 includes implementing one or more artificial intelligence techniques (e.g., at least one artificial neural network (ANN) module) in connection with one or more speech synthesis tasks. In at least one embodiment, implementing one or more artificial intelligence techniques includes combining at least one LM, at least one TTS-FE model and at least one TTS-P model. Additionally or alternatively, implementing one or more artificial intelligence techniques can include converting, using a language model-text-to-speech algorithm adaptor, at least a portion of output from at least one LM to phonetic data and prosodic data to be used as input for one or more of at least one TTS-FE model and at least one TTS-P model. In such an embodiment, implementing one or more artificial intelligence techniques can include using a language model-text-to-speech algorithm adaptor in conjunction with generating one or more HPC features derived from one or more statistical measurements taken over one or more hierarchical temporal intervals, and normalized to represent one or more speaker-agnostic features, wherein at least a portion of the one or more HPC features includes one or more global assessments and one or more local assessments of at least one of phone rate, pitch, and/or volume.

Also, in one or more embodiments, implementing one or more artificial intelligence techniques includes modifying at least a portion of at least one LM using one or more items of phonetic data. In such an embodiment, implementing one or more artificial intelligence techniques can include extracting the one or more items of phonetic data from at least one set of training text data using at least one TTS-FE model.

Additionally or alternatively, implementing one or more artificial intelligence techniques can include modifying at least a portion of at least one LM using one or more items of prosodic data (e.g., pitch-related information, phoneme duration-related information, and/or phrase break-related information). In such an embodiment, implementing one or more artificial intelligence techniques can include extracting the one or more items of prosodic data from at least one set of training text data using at least one TTS-P model.

Further, in at least one embodiment, implementing one or more artificial intelligence techniques includes modifying at least a portion of at least one LM using one or more items of speech data in connection with at least one automated speech recognition technique and one or more prosodic feature extraction techniques.

Step 804 includes generating, in multiple sequential portions, at least one sequence of data, comprising one or more of phonetic data and prosodic data, by processing at least one previously generated sequence of data (and optionally a related text query) using the one or more artificial intelligence techniques. In one or more embodiments, generating at least one sequence of data includes generating one or more phonemes and generating one or more items of prosodic information in conjunction with one or more output words related to the at least one previously generated sequence of data. In such an embodiment, generating one or more items of prosodic information can include generating one or more hierarchical prosody control (HPC) features derived from one or more statistical measurements taken over one or more hierarchical temporal intervals, and normalized to represent one or more speaker-agnostic features, wherein at least a portion of the one or more HPC features includes at least one of one or more global assessments and one or more local assessments of at least one of phone rate, pitch, and volume.

Additionally or alternatively, generating, in multiple sequential portions, at least one sequence of data, comprising one or more of phonetic data and prosodic data, can include generating, one or more phonetic vectors and one or more prosodic vectors at a time, the at least one sequence of data.

Step 806 includes generating speech data corresponding to at least a portion of the sequence of data by processing the at least a portion of the sequence of data using at least one artificial intelligence-based speech synthesis model. In at least one embodiment, generating speech data includes generating one or more speech waveforms corresponding to at least a portion of the sequence of data.

The techniques depicted in FIG. 8 can also include automatically training at least a portion of the one or more artificial intelligence techniques using at least a portion of the generated speech data. Additionally, in one or more embodiments, software implementing the techniques depicted in FIG. 8 can be provided as a service in a cloud environment.

The above-described illustrative embodiments provide significant advantages relative to conventional approaches. For example, some embodiments are configured to generate speech data using artificial intelligence techniques in connection with phonetic data and/or prosodic data. These and other embodiments can effectively overcome problems associated with latency issues, accuracy issues, and inability to sufficiently capture style and emotion in speech data.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on input text data, phonetic data, and/or prosodic information, and such recommendations and/or predictions can be used to initiate one or more automated actions (e.g., automatically generating speech data in connection with one or more TTS systems, automatically training one or more artificial intelligence techniques (e.g., one or more LMs), etc.).

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as enhanced speech data generation code 926. In addition to code 926, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and code 926, as identified above), peripheral device set 914 (including user interface (UI)

device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Figure 9:
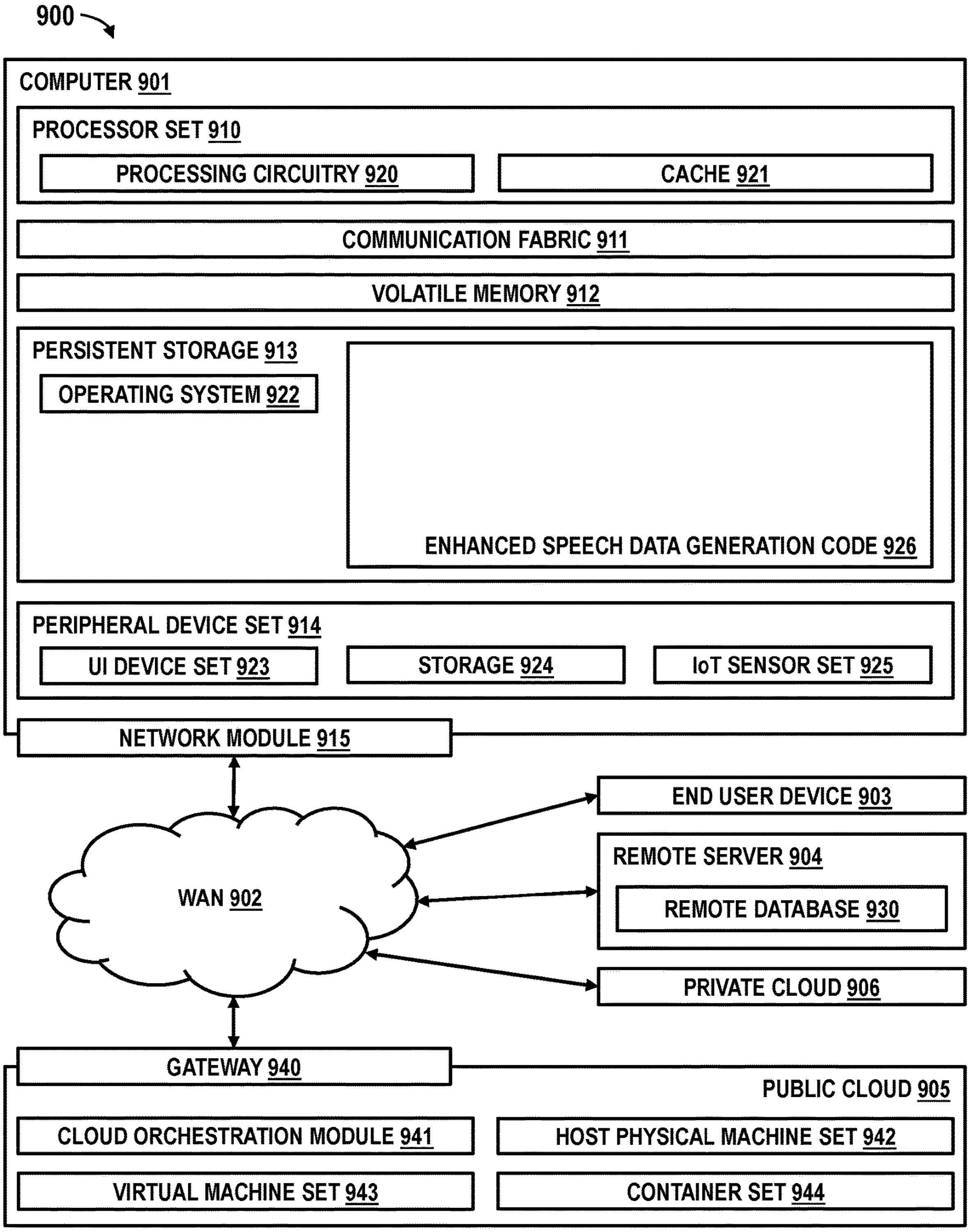
FIG. 9 is a diagram illustrating a computing environment in which at least one embodiment of the invention can be implemented.

Computer 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

Processor set 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located “off chip.” In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in code 926 in persistent storage 913.

Communication fabric 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 912 is any type of volatile memory now known or to be developed in the future. Examples include dynamic type RAM or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

Persistent storage 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a ROM, but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in code 926 typically includes at least some of the computer code involved in performing the inventive methods.

Peripheral device set 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

Network module 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

Remote server 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

Public cloud 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

In computing environment 900, computer 901 is shown as being connected to the internet (see WAN 902). However, in many embodiments of the present invention computer 901 will be isolated from communicating over communications network and not connected to the internet, running as a standalone computer. In these embodiments, network module 915 of computer 901 may not be necessary or even desirable in order to ensure isolation and to prevent external communications coming into computer 901. The standalone computer embodiments are potentially advantageous, at least in some applications of the present invention, because they are typically more secure. In other embodiments, computer 901 is connected to a secure WAN or a secure LAN instead of WAN 902 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a memory configured to store program instructions; and a processor operatively coupled to the memory to execute the program instructions to:

implement artificial intelligence techniques in connection with one or more speech synthesis tasks, wherein implementing artificial intelligence techniques comprises combining at least one language model (LM), at least one text-to-speech frontend (TTS-FE) model and at least one text-to-speech prosody (TTS-P) model;

generate, in multiple sequential portions, at least one sequence of data comprising phonetic data and prosodic data, by processing at least one previously generated sequence of data using the artificial intelligence techniques, wherein generating the at least one sequence of data comprises:

generating one or more phonemes and one or more items of prosodic data associated with one or more output words related to the at least one previously generated sequence of data;

using at least a portion of the one or more phonemes and the one or more items of prosodic data to generate one or more hierarchical prosody control (HPC) features comprising at least one of (i) one or more global assessments of at least one of phone rate, pitch, and volume, and (ii) one or more local assessments of at least one of phone rate, pitch, and volume; and generating, as at least part of the at least one sequence of data, one or more vectors based at least in part on the one or more HPC features; and generate speech data corresponding to at least a portion of the at least one sequence of data by processing the at least a portion of the at least one sequence of data using at least one artificial intelligence-based speech synthesis model.

2. The system of claim 1, wherein generating speech data comprises generating one or more speech waveforms corresponding to at least a portion of the at least one sequence of data.

3. The system of claim 1, wherein implementing artificial intelligence techniques comprises converting, using a language model-text-to-speech algorithm adaptor, at least a portion of output from the at least one LM to phonetic data and prosodic data to be used as input for one or more of the at least one TTS-FE model and the at least one TTS-P model.

4. The system of claim 3, wherein implementing artificial intelligence techniques comprises using a language model-text-to-speech algorithm adaptor in conjunction with generating one or more HPC features derived from one or more statistical measurements taken over one or more hierarchical temporal intervals, and normalized to represent one or more speaker-agnostic features, wherein at least a portion of the one or more HPC features comprises at least one of (i) one or more global assessments of at least one of phone rate, pitch, and volume, and (ii) one or more local assessments of at least one of phone rate, pitch, and volume.

5. The system of claim 1, wherein implementing artificial intelligence techniques comprises:

modifying at least a portion of the at least one LM using one or more items of the phonetic data; and extracting the one or more items of the phonetic data from at least one set of training text data using the at least one TTS-FE model.

6. The system of claim 1, wherein implementing artificial intelligence techniques comprises:

modifying at least a portion of the at least one LM using the one or more items of prosodic data; and extracting the one or more items of prosodic data from at least one set of training text data using the at least one TTS-P model.

7. The system of claim 1, wherein implementing artificial intelligence techniques comprises modifying at least a portion of the at least one LM using one or more items of speech data in connection with at least one automated speech recognition technique and one or more prosodic feature extraction techniques.

8. The system of claim 1, wherein the processor is further operatively coupled to the memory to execute the program instructions to:

automatically train at least a portion of the artificial intelligence techniques using at least a portion of the generated speech data.

9. A computer program product comprising a non-transitory computer readable storage medium having program instructions embodied therewith, the program instructions executable by a computing device to cause the computing device to:

implement artificial intelligence techniques in connection with one or more speech synthesis tasks, wherein implementing artificial intelligence techniques comprises combining at least one language model (LM), at least one text-to-speech frontend (TTS-FE) model and at least one text-to-speech prosody (TTS-P) model;

generate, in multiple sequential portions, at least one sequence of data comprising phonetic data and prosodic data, by processing at least one previously generated sequence of data using the artificial intelligence techniques, wherein generating the at least one sequence of data comprises:

generating one or more phonemes and one or more items of prosodic data associated with one or more output words related to the at least one previously generated sequence of data;

using at least a portion of the one or more phonemes and the one or more items of prosodic data to generate one or more hierarchical prosody control (HPC) features comprising at least one of (i) one or more global assessments of at least one of phone rate, pitch, and volume, and (ii) one or more local assessments of at least one of phone rate, pitch, and volume; and generating, as at least part of the at least one sequence of data, one or more vectors based at least in part on the one or more HPC features; and generate speech data corresponding to at least a portion of the at least one sequence of data by processing the at least a portion of the at least one sequence of data using at least one artificial intelligence-based speech synthesis model.

10. The computer program product of claim 9, wherein implementing artificial intelligence techniques comprises converting, using a language model-text-to-speech algorithm adaptor, at least a portion of output from the at least one LM to phonetic data and prosodic data to be used as input for one or more of the at least one TTS-FE model and the at least one TTS-P model.

11. The computer program product of claim 10, wherein implementing artificial intelligence techniques comprises using a language model-text-to-speech algorithm adaptor in conjunction with generating one or more HPC features derived from one or more statistical measurements taken over one or more hierarchical temporal intervals, and normalized to represent one or more speaker-agnostic features, wherein at least a portion of the one or more HPC features comprises at least one of (i) one or more global assessments of at least one of phone rate, pitch, and volume, and (ii) one or more local assessments of at least one of phone rate, pitch, and volume.

12. A computer-implemented method comprising:

implementing artificial intelligence techniques in connection with one or more speech synthesis tasks, wherein implementing artificial intelligence techniques comprises combining at least one language model (LM), at least one text-to-speech frontend (TTS-FE) model and at least one text-to-speech prosody (TTS-P) model;

generating, in multiple sequential portions, at least one sequence of data comprising phonetic data and prosodic data, by processing at least one previously generated sequence of data using the artificial intelligence techniques, wherein generating the at least one sequence of data comprises:

generating one or more phonemes and one or more items of prosodic data associated with one or more output words related to the at least one previously generated sequence of data;

using at least a portion of the one or more phonemes and the one or more items of prosodic data to generate one or more hierarchical prosody control (HPC) features comprising at least one of (i) one or more global assessments of at least one of phone rate, pitch, and volume, and (ii) one or more local assessments of at least one of phone rate, pitch, and volume; and generating, as at least part of the at least one sequence of data, one or more vectors based at least in part on the one or more HPC features; and generating speech data corresponding to at least a portion of the at least one sequence of data by processing the at least a portion of the at least one sequence of data using at least one artificial intelligence-based speech synthesis model;

wherein the method is carried out by at least one computing device.

13. The computer-implemented method of claim 12, wherein implementing artificial intelligence techniques comprises converting, using a language model-text-to-speech algorithm adaptor, at least a portion of output from the at least one LM to phonetic data and prosodic data to be used as input for one or more of the at least one TTS-FE model and the at least one TTS-P model.

14. The computer-implemented method of claim 13, wherein implementing artificial intelligence techniques comprises using a language model-text-to-speech algorithm adaptor in conjunction with generating one or more HPC features derived from one or more statistical measurements taken over one or more hierarchical temporal intervals, and normalized to represent one or more speaker-agnostic features, wherein at least a portion of the one or more HPC features comprises at least one of (i) one or more global assessments of at least one of phone rate, pitch, and volume, and (ii) one or more local assessments of at least one of phone rate, pitch, and volume.

15. The computer-implemented method of claim 12, wherein implementing artificial intelligence techniques comprises:

modifying at least a portion of the at least one LM using the one or more items of prosodic data; and extracting the one or more items of prosodic data from at least one set of training text data using the at least one TTS-P model.

16. The computer-implemented method of claim 12, wherein implementing artificial intelligence techniques comprises modifying at least a portion of the at least one LM using one or more items of speech data in connection with at least one automated speech recognition technique and one or more prosodic feature extraction techniques.

17. The computer-implemented method of claim 12, further comprising:

automatically training at least a portion of the artificial intelligence techniques using at least a portion of the generated speech data.

18. The computer program product of claim 9, wherein implementing artificial intelligence techniques comprises:

modifying at least a portion of the at least one LM using one or more items of the phonetic data; and extracting the one or more items of the phonetic data from at least one set of training text data using the at least one TTS-FE model.

19. The computer program product of claim 9, wherein implementing artificial intelligence techniques comprises:

modifying at least a portion of the at least one LM using the one or more items of prosodic data; and extracting the one or more items of prosodic data from at least one set of training text data using the at least one TTS-P model.

20. The computer program product of claim 9, wherein implementing artificial intelligence techniques comprises modifying at least a portion of the at least one LM using one or more items of speech data in connection with at least one automated speech recognition technique and one or more prosodic feature extraction techniques.

* * * * *